(No Model.)
T. BRABSON.
HAME TIP.
No. 282,261. Patented July 31, 1883.
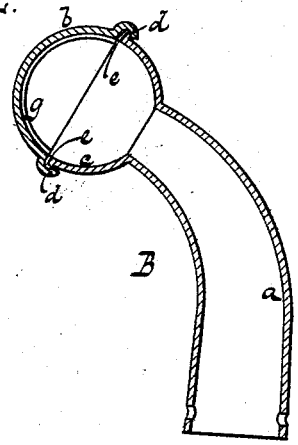
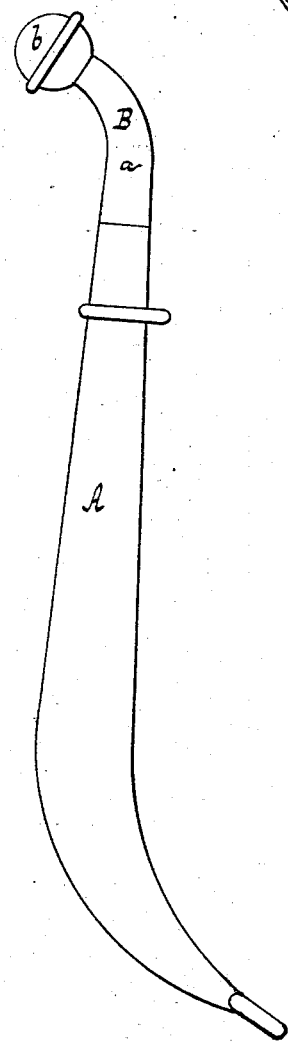
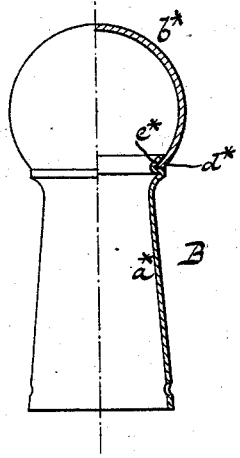
WITNESSES:
INVENTOR
Thomas Brabson
BY
ATTORNEYS

UNITED STATES PATENT OFFICE.

THOMAS BRABSON, OF NEWARK, NEW JERSEY.

HAME-TIP.

SPECIFICATION forming part of Letters Patent No. 282,261, dated July 31, 1883.

Application filed May 31, 1883. (No model.)

*To all whom it may concern:*

Be it known that I, THOMAS BRABSON, a citizen of the United States, residing at Newark, in the county of Essex and State of New Jersey, have invented new and useful Improvements in Hame-Tips, of which the following is a specification.

This invention relates to a hame-tip composed of a tubular shank and a globe-shaped head, said parts being made separate and united by spinning, soldering, or bracing.

The peculiar construction of my hame-tip is pointed out in the following specification and illustrated in the accompanying drawings, in which—

Figure 1 represents a front elevation of a hame provided with my tip. Fig. 2 is a longitudinal section of the tip detached on a larger scale than the previous figure. Fig. 3 is a similar view of a modification of my tip.

Similar letters indicate corresponding parts.

In these drawings, the letter A designates the wooden body of the hame, and B is the metallic tip.

The form of my tip is the same as that of tips in common use, such tips being composed of a tubular shank and globe-shaped head, which parts, however, in tips as now constructed, are cast in one piece, whereby various disadvantages arise. The first and principal disadvantage is caused by the core, which has no support at one end, and which therefore requires very delicate handling and adjustment. Further, owing to the unsupported state of the core at one end, the walls of such tips are very rarely of uniform thickness, and a greater thickness of metal must be provided for in order to make sure of sound tips. The tips therefore become unnecessarily heavy and their cost is increased. These disadvantages are avoided by my invention.

My tip is constructed of a tubular shank, $a$, and a hemispherical head, $b$, the shank being provided at its end with a hemispherical enlargement, $c$, (see Fig. 2,) so that when the head $b$ is secured to the enlargement $c$ a globe-shaped head is produced. The shank $a$ is open at both ends, and the core used in casting the same can be supported at both ends, so that the walls of the shank, when cast, are of uniform thickness throughout. The head $b$ can also be cast without any difficulty, and it is provided at its edge with a flange, $d$, which fits nicely over a bead or projection, $e$, formed at the enlargement $c$, so that the two parts can be readily united, either by pressing the flange $d$ inward beneath the projection $e$ (see Fig. 2) or by soldering or bracing.

Instead of casting the shank $a$ and the head $b$, however, I can make these parts of sheet metal, as shown in Fig. 3. In this case I stamp up the tubular shank $a^*$, of sheet metal, first in the form of a plain tapering tube, which, when finished, is provided at its small end with an outwardly-flaring projection, $e^*$. The head $b$ is produced by spinning, and its edge $d^*$ is caused to engage with the flaring projection $e^*$, as shown in Fig. 3. If desired, the two parts may then be firmly united by soldering or bracing.

By the means above described I am enabled to produce light and durable hame-tips at less expense than hame-tips of similar form can be manufactured by the old method.

If desired, the head $b$ or $b^*$ of my tip may be strengthened by introducing therein a plate of sheet-iron, $g$, Fig. 2.

I am aware that a hame-tip has heretofore been composed of a skeleton frame secured to the hame and having a knob or button screwed upon its outer end, and such, therefore, I do not claim.

What I claim as new, and desire to secure by Letters Patent, is—

1. As an improved article of manufacture, a hame-tip consisting of a tubular shank provided at one end with an annular projection, and a globular head having its annular edge engaged with the annular projection of the shank to permanently unite the said parts, substantially as described.

2. A hame-tip composed of a tubular shank having at one end a hemispherical enlargement, and a hemispherical head, the annular edges of the enlargement and the head being permanently interlocked together, substantially as described.

3. The combination, in a hame-tip, of a tubular shank provided at its top with a circular projection, and a head the edge of which is permanently interlocked with the circular projection of the shank, substantially as shown and described.

In testimony whereof I have hereunto set my hand and seal in the presence of two subscribing witnesses.

THOMAS BRABSON. [L. S.]

Witnesses:
W. HAUFF,
E. F. KASTENHUBER.